United Sta

[11] 3,622,793

| [72] | Inventors | John J. Dalton<br>Rinebeck;<br>George P. Taylor, Red Hook, both of N.Y. |
| --- | --- | --- |
| [21] | Appl. No. | 811,481 |
| [22] | Filed | Mar. 28, 1969 |
| [45] | Patented | Nov. 23, 1971 |
| [73] | Assignee | International Business Machines Corporation<br>Armonk, N.Y. |

[54] FIBER OPTIC LIGHT TRANSMITTING ASSEMBLY COMPENSATING FOR SHADOWS
2 Claims, 8 Drawing Figs.

[52] U.S. Cl. .................................................. 250/219 D,
250/227, 350/96
[51] Int. Cl. .................................................. G08c 9/06
[50] Field of Search.......................................... 250/227,
219; 350/96; 235/61.115

[56] References Cited
UNITED STATES PATENTS

| 3,184,732 | 5/1965 | Haynes | 250/227 |
| --- | --- | --- | --- |
| 3,235,672 | 2/1966 | Beguin | 250/227 |
| 3,244,894 | 4/1966 | Steele et al. | 250/227 |
| 3,409,870 | 11/1968 | Mounce et al. | 350/96 |
| 3,481,195 | 12/1969 | Hendrickson et al. | 235/61.7 |
| 3,043,179 | 7/1962 | Dunn | 250/227 |
| 3,124,675 | 3/1964 | Epstein | 250/227 |
| 3,215,135 | 11/1965 | Franke | 350/96 |
| 3,248,554 | 4/1966 | Wu Chen | 250/219 |
| 3,356,854 | 12/1967 | Humphrey | 250/227 |

*Primary Examiner*—Walter Stolwein
*Attorneys*—Hanifin and Jancin and A. Sidney Alpert ABSTRACT: A light transmitting assembly utilizing fiber optic elements to pass light from a source to a sensing station. The assembly includes a mounting block or body for the fiber optic elements, having a single input channel adjacent the light source and plural output channels located adjacent the sensing station. The fiber optic elements are arranged in layers in the input channel, and each layer is randomly arranged in a separate output channel. Shadows cast on the input end of the fiber optic elements are diffused or averaged out over the layers, and a substantially equal amount of light emanates from each output channel.

INVENTORS
JOHN J. DALTON
GEORGE P. TAYLOR

ATTORNEY

3,622,793

FIBER OPTIC LIGHT TRANSMITTING ASSEMBLY COMPENSATING FOR SHADOWS

BACKGROUND OF THE INVENTION

This invention relates generally to the field of light transmission, and more particularly to optical assemblies that assure the uniform transmission of illumination from a source that produces illumination of unequally distributed intensity. The invention also relates to methods of producing such assemblies.

In certain machines, such as keypunches and other key entry devices, the sensing or reading of digital data is accomplished, inter alia, optically by light responsive devices such as photocells, phototransistors or the like. Considerable difficulty has been experienced in practice with such arrangements, since certain light sources may produce illumination of unequally distributed intensity. That is to say, these light sources produce shadows such as elongated vertical or horizontal dark areas. Since photocells and phototransistors may be sensitive to variations in illumination intensity, or unequal distribution of light, they may not be properly actuated in such cases.

In certain arrangements, the light source transmits its light output directly to a sensing station. In other arrangements, fiber optic bundles may be used to transmit the light from the source to the sensing station where the photocells or phototransistors are located. The above problem has been encountered in both arrangements. For example, if the light source casts a shadow, and thereby does not illuminate some portion of the input end of a fiber optic bundle, the portion will transmit as much light as other fiber optic bundles or portions thereof. Of course, it is possible to utilize expensive light sources which do not cast shadows, and/or expensive light responsive devices which are not adversely affected by variations in light to avoid this problem. However, it will be appreciated that this is not practical in many cases, for example, where cost is of primary concern.

Accordingly, it is an object of the present invention to provide an improved light transmitting assembly that will transmit an equal amount of illumination to various locations from a nonuniform light source.

It is another object of the present invention to provide an improved light transmitting assembly that will average out or diffuse shadows produced by a light source and thereby enable the use of relatively inexpensive components in a data sensing or reading apparatus.

It is another object of the present invention to provide digital data sensing apparatus having an improved light transmission assembly for enabling the uniform transmission of light to a plurality of locations.

It is a further object of the present invention to provide a method of producing improved light transmitting assemblies.

SUMMARY OF THE INVENTION

In the preferred embodiment of the invention, there is provided a program device including a perforate drum adapted to receive a punched card, light responsive means aligned with the apertures in the drum and card and a light transmitting assembly located between the light source and drum. The light transmitting assembly includes a mounting block or body member having an input end located adjacent the light source for receiving illumination and an output end located adjacent the drum. A fiber optic bundle comprising a plurality of fiber optic elements is located in an input or entrance channel that opens at the input side of the body member, with the elements arranged in discrete or ordered layers in the input channel, forming a light input face. Each layer contains a plurality of in- and coherently arranged fiber optic elements forming a subbundle, and each subbundle extends through the body member respectively to a separate exit or output channel at the output side of the body member, thereby forming a light output face. In the illustrated embodiment, there are an equal number of output channels as there are positions of punched apertures in the drum. Light from the source passes into the fiber optic bundle through its input face, through the light transmitting assembly to each corresponding one of a line of sensing means or phototransistors, at various locations, after passing through the punched apertures in card and drum.

An important advantage of the present invention is that the light transmitting assembly causes shadows projected onto the input face of the fiber optic bundle by the light source to be averaged out or diffused over the various subbundles or layers, and the illumination emanating from the output faces is thereby substantially equalized. This is especially important where sensing means that are adversely affected by variations in light input are used.

In accordance with another aspect of the present invention, the light transmitting assembly is produced by alternately arranging layers of fiber optic elements or subbundles and shim means in the input channel of the body member. The other ends of each layer of fiber optic elements are arranged in preselected of the output channels of the body member with each subbundle taking a sinusoidal path through the body member from input to its respective output channel. Where all the fiber optic bundles are arranged in the body member, the shim means are removed, and the layers are maintained in this relationship by being potted in place in the body member. At this time, the assembly is cut to size, and the input and output faces of the fiber optic elements ground and polished to obtain the maximum light transmission therethrough.

This method of production is advantageous as it insures substantially equal light transmission through each subbundle. Further, by the preferred method, there are no preliminary assembly steps; but, rather, the fiber optic elements are assembled right in place in the body member. The method also insures a higher packing efficiency of the fiber optic elements than would otherwise be achieved.

DESCRIPTION OF THE PREFERRED EMBODIMENT

Figure 1:
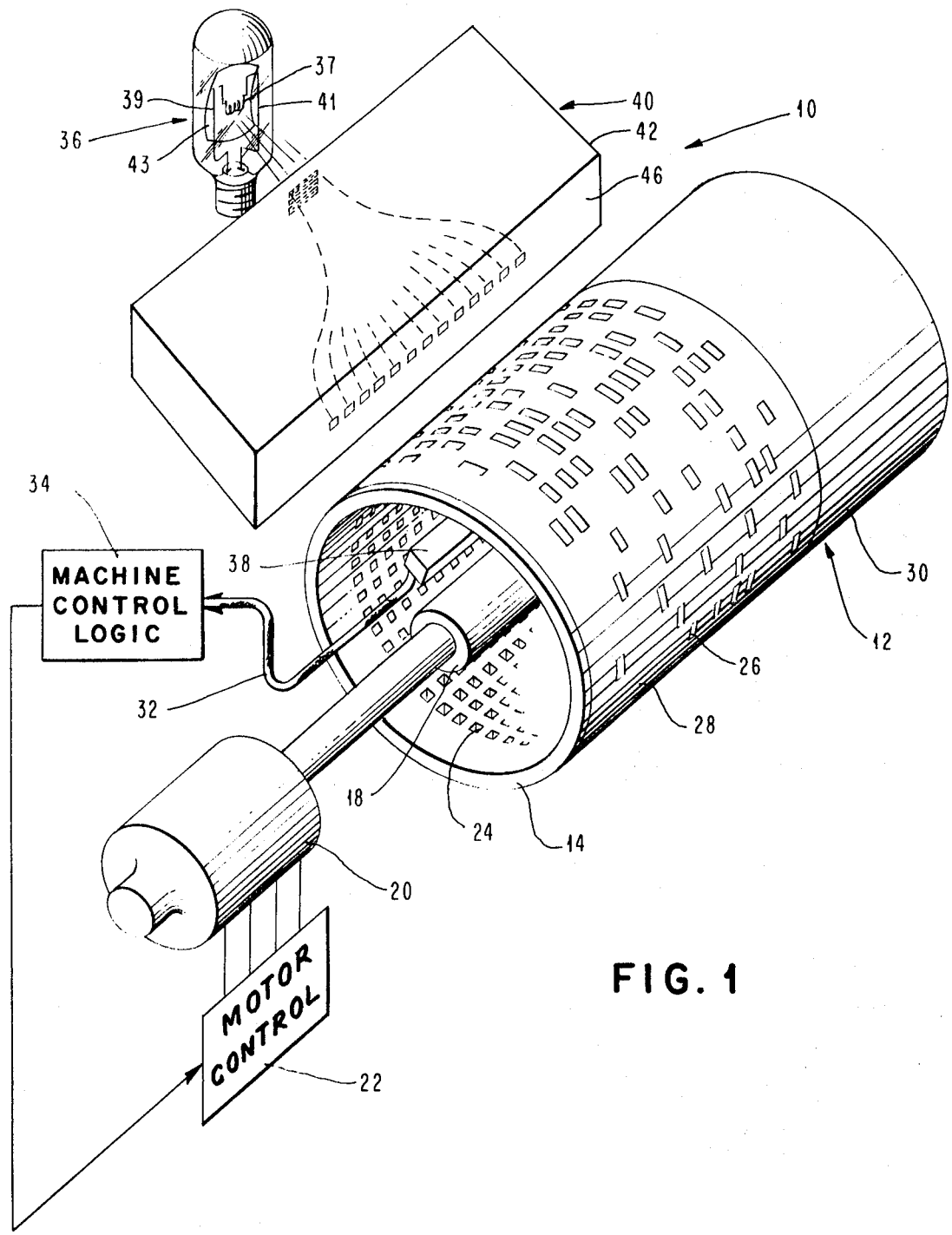
FIG. 1 is a simplified perspective view, in partially schematic form, showing the arrangement of the digital data sensing apparatus of the present invention, with the light transmitting assembly in place between the light source and drum.
Figure 2:
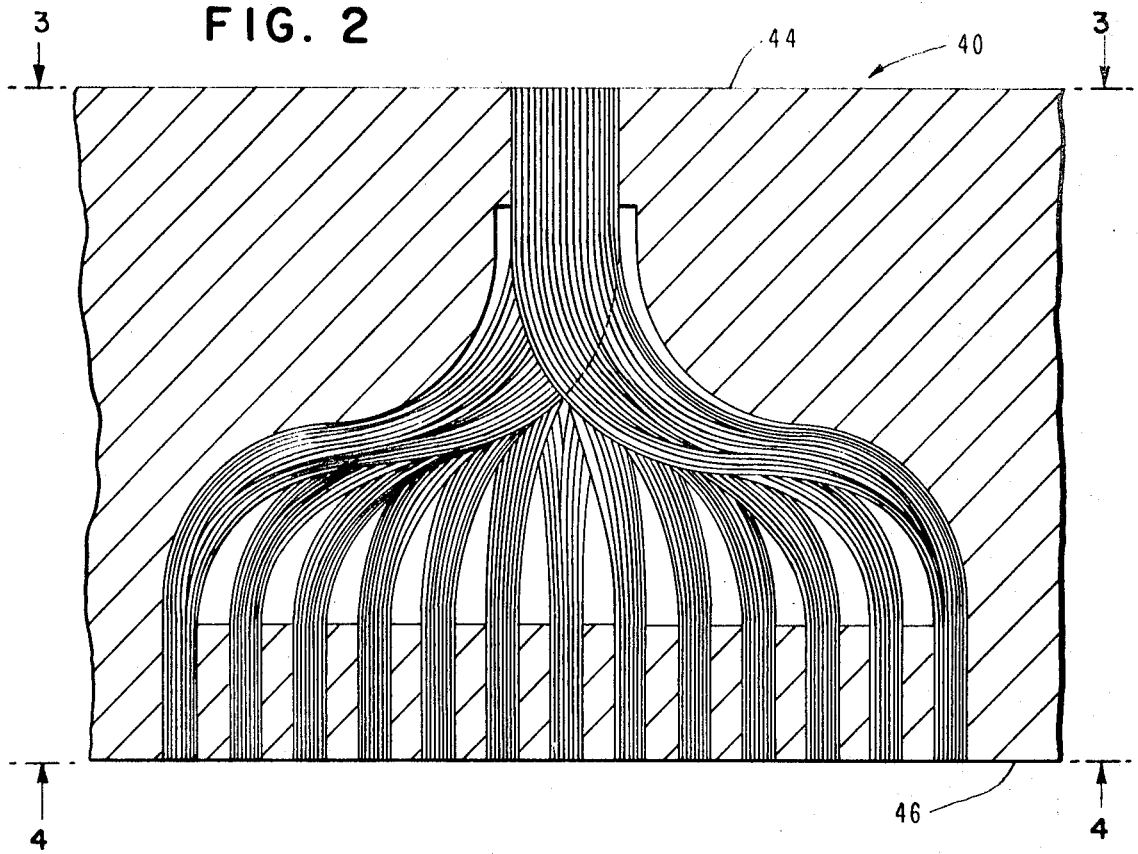
FIG. 2 is an enlarged top plan view, partially broken away, of the light transmitting assembly.
Figure 3:
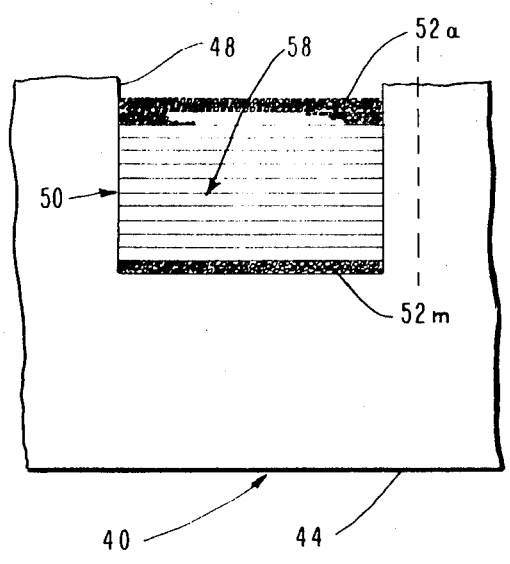
FIG. 3 is a still further enlarged elevational view taken substantially on the plane on the line 3—3 of FIG. 2.
Figure 4:
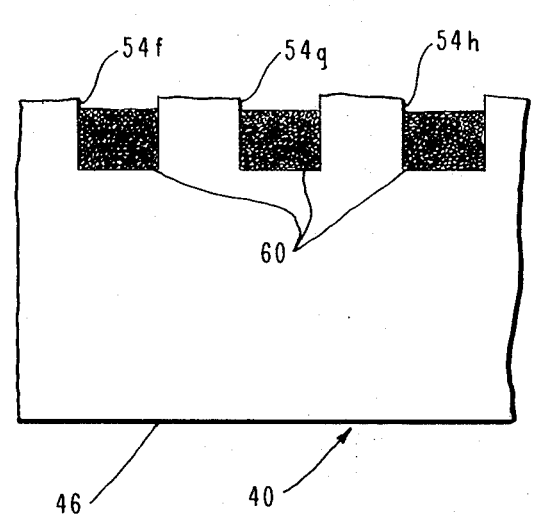
FIG. 4 is another enlarged elevational view taken substantially on the plane of line 4—4 of FIG. 2.

Referring now more specifically to the drawings, and especially to FIG. 1, there is shown a digital data sensing or reading apparatus generally denoted by reference numeral 10. In the preferred embodiment, the sensing apparatus 10 comprises a program device 12 for controlling operation of a machine such as a keypunch or other key entry device. The program device 12 includes a partially perforate drum 14 mounted on a shaft 16 and removable therefrom by means of mounting collar 18. The shaft 16 is operable in increments by a stepping motor 20, under control of suitable motor control circuits 22 such as are well known to those skilled in the art. The drum includes a plurality of rows of apertures 24 which correspond in placement and number to every possible punched aperture 26 in a punched card 28. The punched card 28 is normally mounted on the drum by being wrapped thereabout and fastened in place by suitable fastening means. The apparatus 10 may be of the type shown in the IBM Technical Disclosure Bulletin, Volume 11, No. 1, dated June 1968 at page 81. As will be seen therein, a portion of the card 30 has printed thereon the identification of various machine instructions which are also punched in the card in digital form. Also, as explained further therein, each line of apertures 26 in the card 28 running longitudinally of the drum 14 constitutes a machine instruction which is communicated via a cable 32 to machine control logic circuits 34. It will be appreciated by those skilled in the art, that the motor control and machine control logic circuits 22 and 34 respectively may take various forms, and that the instructions in the form of digital data 26 in card 28 can control operation of a machine, or alternatively, the perforate drum may be utilized to read or verify the digital information contained in the card, as in the case of a card reader or verifier.

In accordance with the operation of the data sensing apparatus 10, there is a light source generally denoted by reference numeral 36 that is arranged to provide illumination to a sensing means or sensor 38. The light source 36 and sensor 38 are located respectively outside and inside the drum so that light from the source may pass through aligned of the apertures 26 and 24 in card and drum to actuate the sensor. In practice, the light source 36 takes the form of a tungsten filament lamp, and the sensor 38 takes the form of a phototransistor array having a line of phototransistors corresponding to each aperture 24 in the drum 14. It will be appreciated, of course, that light source 36 may produce radiant energy in either the visible or nonvisible range. As will be seen in the aforementioned publication, and as well in the copyrighted publication entitled IBM System/360 Component Description—IBM 50 Magnetic Data Inscriber, Second Edition, Aug. 1968, the program card 28, and the drum 14, have 13 apertures in each row running longitudinally of the drum and card. In each location, or behind each aperture is a phototransistor.

Also in accordance with the present invention, there is a light transmitting assembly generally denoted by reference numeral 40 that is provided in order to transmit an equal amount of illumination to each of the various locations containing one of the row of apertures 24 in drum 14. Thus, the light transmitting assembly 40 is used to pass light from the source 36 to the sensing station where the sensor 38 is located. The lamp 36, being a well-known tungsten filament lamp for example, a Sylvania projection lamp designated CXL, has a filament 37, mounting posts 39, 41 for the filament, and a reflector 43. In this type lamp, the reflector reflects illumination back past the filament and filament mounting posts and thereby creates elongate shadows. In the illustrated embodiment, the shadows that are cast are vertical in view of the type of lamp used. It will be realized, however, that other types of lamps may cast horizontal or slanted shadows. A primary purpose of the light transmitting assembly 40, as noted above, is to average out the shadows to insure that each phototransistor in sensor 38 receives a substantially equal amount of illumination from the source 36.

The details of the light transmitting assembly 40 will now be described in conjunction with FIGS. 1-4. The light transmitting assembly 40 includes a mounting block or body member 42 which, as will be seen, is of generally rectangular cross section. In practice, the body member 42 may be a suitable rigid material such as phenolic resin or the like. The body member 42 has an input side 44 located adjacent the light source 36, and an output side 46 located adjacent the drum 14. Opening at the input side 44 of the body member 40 is an input or entrance channel 48. Located in the input channel 48 are a plurality of fiber optic elements generally designated by reference numeral 50. In the embodiment, 5 mil outer diameter clad glass fibers were used. As will be seen, particularly in FIGS. 2 and 3, the plurality of fiber optic elements form a flexible fiber optic bundle, and are arranged in horizontal layers designated, from top to bottom, by reference numerals 52a-52. Each of these layers is a discrete, ordered subbundle containing, in the embodiment, 1500 to 2000 of the fiber optic elements.

Opening at the output side 46 of the body member 40 there are output or exit channels 54a-54m, corresponding in number to the layers 52a-52m and to the various locations at the sensing station, i.e., the 13 phototransistors in sensor 38. Contained in each of the output channels is one of the subbundles of fiber optic elements. The fiber optic elements of each subbundle are arranged in random or incoherent fashion between the input channel 48 and the various output channels 54a-54 to facilitate the even transmission of light to each sensing location. Also, to help average dark spots or shadows between the subbundles, the subbundles of adjacent layers lead, where possible, to nonadjacent output channels.

As is known to those skilled in the art, coherent bundles of fiber optic elements, such as shown for example, in U.S. Pat. Nos. 3,125,683, 3,379,890 and 3,255,280 are useful for transmitting images since there is point-to-point correlation in placement of input fiber optic elements and output fiber optic elements. Conversely, when fiber optic elements are arranged incoherently, image transmission is impossible, but light transmission is facilitated. The present arrangement, as will be seen in the above-described figures, utilizes a combination of coherent and incoherent arrangements. Thus, the input end of the fiber optic bundle, which forms an input face 58, is arranged in an ordered or layered fashion, and each layer taken as a whole is coherent. However, the individual fiber optic elements within each layer are incoherent, since there is a lack of positional correspondence of the fiber optic elements of each layer between input end and output end. The significance of this arrangement will be appreciated by referring to FIGS. 7 and 8.

Figure 7:
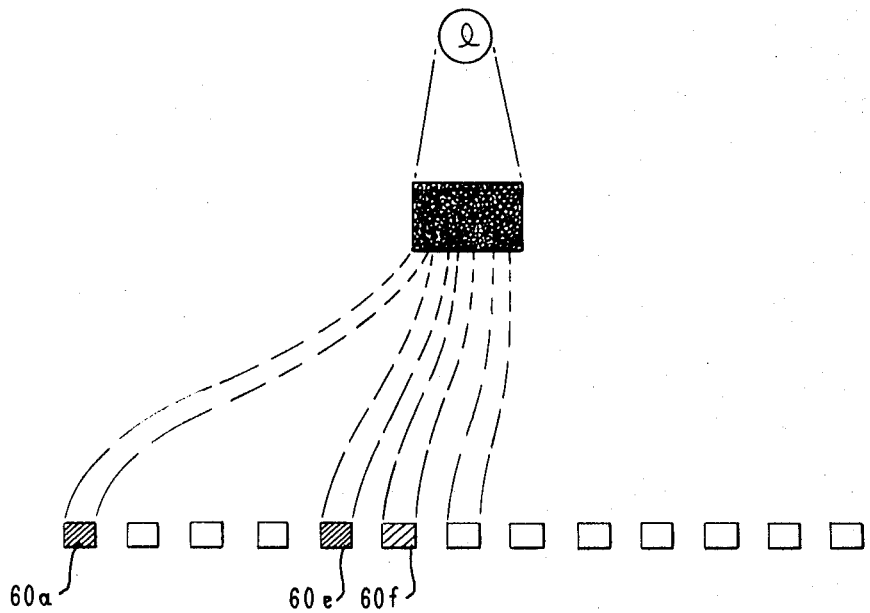
FIGS. 7 and 8 illustrate, in a simplified manner, the effect of transmitting light from a source that produces shadows, when using an assembly of the type known to the prior art (FIG. 7), and of the present invention (FIG. 8).
Figure 8:
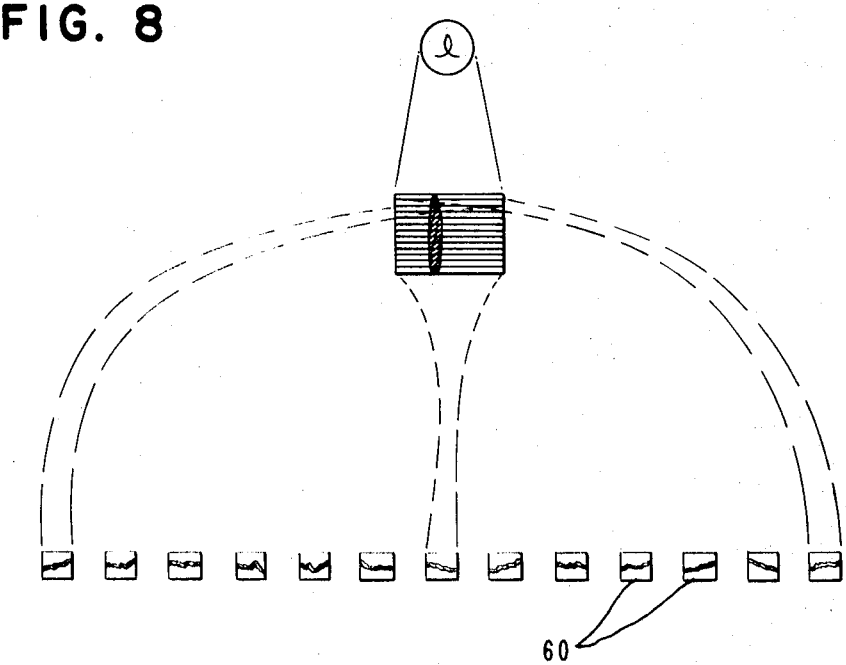

In FIG. 7, there are shown 13 output faces 60a comprising fiber optic elements such as are located in output channels 54a-54. Let it be assumed that the input end of the fiber optic bundle contained in the input channel 48 is arranged in randomly dispersed fashion as shown in FIG. 7, rather than the ordered or layered arrangement shown in FIGS. 3 and 8. With the arrangement, of FIG. 7, since the light source casts shadows as shown, if a shadow falls on a portion of the input face 58 that contains all or nearly all of the fiber optic elements forming one output faces 60a, less illumination is transmitted from that one output face than from the remainder of the output faces; and conceivably that one output face might transmit no illumination at all. Thus, it will be seen in FIG. 7 that output faces designated 60e and 60f do not transmit any light. In such a case, the phototransistors corresponding to these output faces would not be actuated. On the other hand, referring to FIG. 8, if the vertical shadow were to fall on the layered input face 58, each of the 13 output faces 60 would be partially darkened, as the average amount of light transmitted through each of the subbundles and from each output face is substantially the same.

Figure 5:
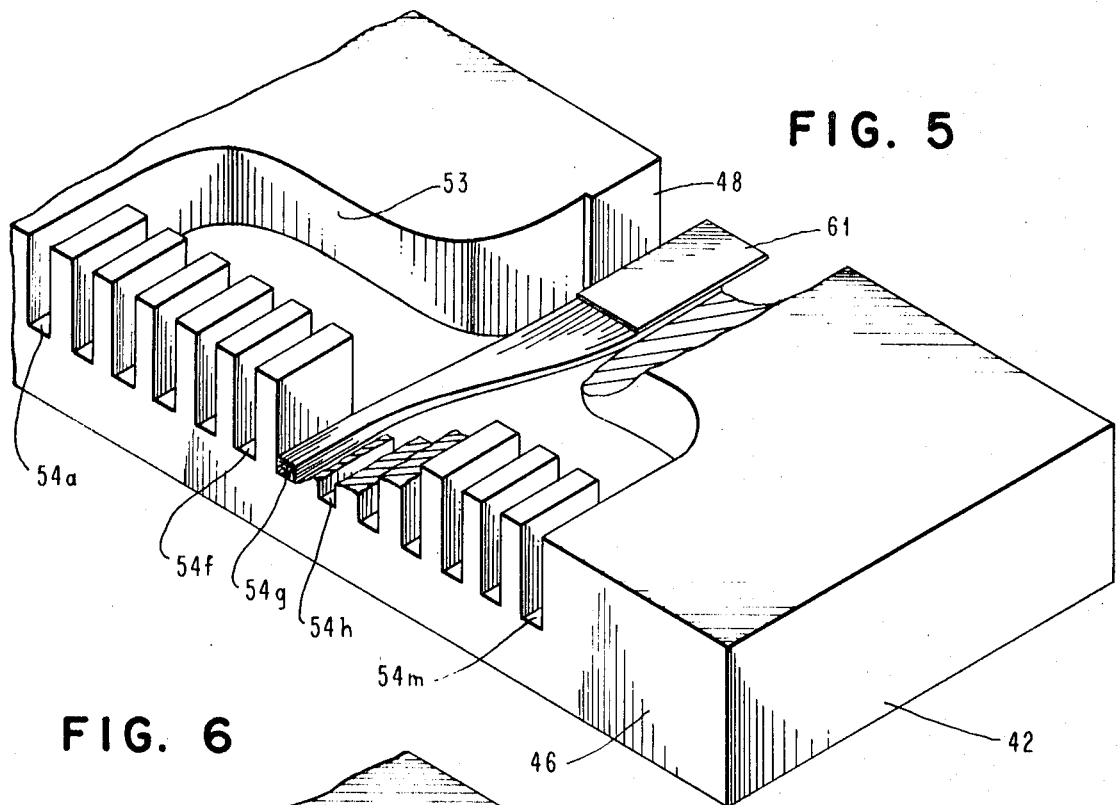
FIGS. 5 and 6 show the preferred method of fabricating the light transmitting assembly of the present invention.
Figure 6:
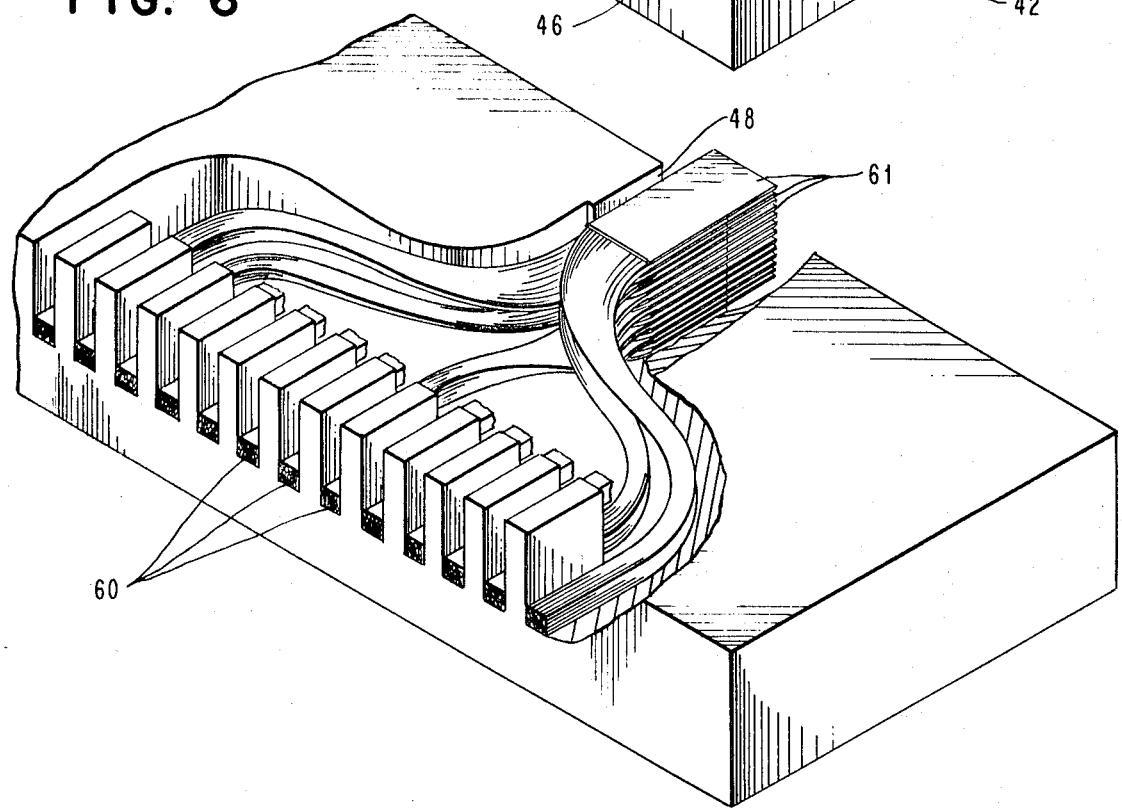

Referring again to FIGS. 2-4, now in conjunction with FIGS. 5 and 6, the preferred method of producing the light transmitting assembly 40 of the present invention will be described. Initially, an empty body member or mounting block 42 in this form shown in FIGS. 5 and 6 is provided. The block 42 has a hollowed out center area or cavity 53, so that the input channel 48 communicates with the 13 exit channels 54a-54. A first subbundle of fiber optic elements is placed in the body member, with its first end forming the layer 52m in the input channel 48 and the other end being randomly arranged in place in exit channel 54g. This random or incoherent arrangement is accomplished by bunching together the subbundle adjacent its output end and forcing it down into channel 54g.

It will be noted that this first or lowermost subbundle is the shortest, since it extends between the input channel 48 and the exit channel 54g closest to the input channel. Since it is desirable that each of the subbundles transmit substantially the same amount of light, it was found to be necessary to induce a bend in each of the subbundles. Thus, it will be understood that the transmission of light through a fiber optic bundle or element depends, inter alia, upon its length since there is approximately a 10 percent attenuation of light per foot. In order to impart a bend in this lowermost subbundle, the output channels 54a-54 are placed somewhat higher in the body member 42 than is input channel 48, as seen by comparing FIGS. 3 and 4. Of course, it will be seen in FIG. 6 that the subbundles leading to the outer channels (such as 54a, 54b, 54n and 54m) naturally take a lateral bend and will be of somewhat greater length than the centermost subbundles.

After the first subbundle or layer 52m is placed in the body member 44, a thin shimming means in the form of a sheet of Mylar or other suitable material 61 is placed in the input channel over the layer 52m, with a portion of the shim extending outwardly of the input side 44 of the body member. Thereafter, the remainder of the layers or subbundles 52a-52 and additional shims are alternately placed in the input channel 48 until a condition such as shown in FIG. 6 is achieved. The shims permit the fiber optic elements comprising each layer to be tightly packed into the input channel 48, while keeping the layers separated.

After all the fiber optic elements are in place in the body member 42, the shims are pulled out from between the various layers, and a suitable potting compound introduced into the cavity 53 in the body member 42, including into the input channel 48 and output channels 54a-54m. A potting compound such as a phenolic resin may be used, provided it is black or a dark color so as to avoid the loss of light from the fiber optic elements. This filling of the cavity with potting compound serves to affix or hold the fiber optic elements rigidly in place in the body member 42, permitting handling and use of the light transmitting assembly 40 without any damage to the fiber optic elements. After potting, the body member is cut substantially to desired dimensions, leaving approximately 20 mils per side for grinding and polishing. Thereafter, the input face 58 and output faces 60 are ground and polished in order to provide for the maximum light transmission through the light transmitting assembly 40. It should be appreciated that the input face must be maintained perpendicular to the optical axis, or within a 30° half angle thereto, to provide a predictable optical path or axis through the body member and to maximize efficiency. Furthermore, the various output faces 60 should also be as close as possible to perpendicular to the optical axis for the same reasons. Thus, it is known that the angle at which light is accepted into the fiber optic bundle is equal to the angle of exit, and that the greater the internal light loss within the bundle due to the greater reflectivity. Accordingly, as effort is made during fabrication of the assembly 40 to maintain the input face 58 parallel to input side 44 (or perpendicular to the optical axis), and to maintain the output faces 60 parallel to input and output sides 44 and 46, to minimize so that the light loss and light passing from the assembly 40 will travel in the desired direction.

The method of assembly described above assures that the fiber optic elements at the output channels will be more nearly parallel to each other, thus minimizing transmission loss therethrough due to random dispersion. Further, the method has proven to exhibit less damage to the fiber optic elements during assembly than previously experienced, thereby improving yield. This assembly method may be automated, if desired, to place a predetermined number of fibers in each layer. Furthermore two mounting blocks or body members may be assembled at the same time, by mounting their output sides in close adjacency, and routing each layer from one input channel of the first body member, through the output channels of both body members to the input channel of the second body member. The two body members can then later be cut apart into two light transmitting assemblies.

While the light transmitting assembly 40 is shown in conjunction with a particular digital data sensing or control system, it will be appreciated that the light transmitting assembly may be utilized whenever it is desired to average the light output from an uneven light source and to present an equal amount of light to one or more locations. Thus, for example, the light transmitting assembly of the present invention may find use in such a device as hole sensing verifiers, various work sensing apparatus, or apparatus for card or map reading.

While the invention has been particularly shown and described with reference to preferred embodiments thereof, it would be understood by those skilled in the art that the foregoing and other changes in form and detail may be made therein without departing from the spirit and scope of the invention.

We claim:

1. In a record sensing apparatus having a source of radiant energy which produces elongated shadows, means for representing digital data in the form of one or more rows of apertures in a record and light responsive means adapted to be energized by light passing through said apertures, a light transmitting assembly comprising:

a body member having input and output sides, with said input side located to receive illumination from said source and said output side located to pass the illumination to said light responsive means;

an input channel opening in said input side;

a plurality of output channels opening in said output side;

a fiber optic bundle having its first end arranged in a predetermined pattern in said input channel to receive illumination from said source; and said fiber optic bundle being split into layers extending substantially perpendicularly to the elongated shadows produced by said source to form subbundles to equalize the radiant energy received by each subbundle, each of said subbundle being randomly arranged in one of said output channels.

2. The apparatus set forth in claim 1 wherein each of said fiber optic bundles takes a tortuous path between said input channel and its respective one output channel whereby the amount of light loss from each said subbundle associated with the length of the optical path is substantially equalized.

* * * * *